Sept. 21, 1965 A. L. DE FINA ETAL 3,207,853

PUSHBUTTON SIGNAL TRANSMITTER

Filed Jan. 4, 1962 4 Sheets-Sheet 1

INVENTORS A. L. DE FINA
W. W. WERRING

BY John C. Morris

ATTORNEY

Sept. 21, 1965 A. L. DE FINA ETAL 3,207,853

PUSHBUTTON SIGNAL TRANSMITTER

Filed Jan. 4, 1962 4 Sheets-Sheet 2

INVENTORS A. L. DE FINA
W. W. WERRING

BY John C. Morris

ATTORNEY

PUSHBUTTON SIGNAL TRANSMITTER

Filed Jan. 4, 1962 4 Sheets-Sheet 3

INVENTORS A. L. DE FINA
W. W. WERRING
BY John C. Morris
ATTORNEY

PUSHBUTTON SIGNAL TRANSMITTER

Filed Jan. 4, 1962 4 Sheets-Sheet 4

INVENTORS A. L. DE FINA
W. W. WERRING

BY John C. Morris

ATTORNEY 3,207,853
Patented Sept. 21, 1965

3,207,853

PUSHBUTTON SIGNAL TRANSMITTER

Angelo L. De Fina, Brooklyn, and Walter W. Werring, New York, N.Y., assignors to Bell Telephone Laboratories, Incorporated, New York, N.Y., a corporation of New York Filed Jan. 4, 1962, Ser. No. 164,287
9 Claims. (Cl. 179—90)

This invention is concerned with signal transmitters and, more particularly, with pushbutton or key transmitters that are capable of operating a signal means, such as that used for telephone calling.

An object of this invention is to improve signal transmitters such as those used for telephone calling or "dialing," as it is more familiarly known.

A more particular object is to increase the speed of and to reduce the error possibilities of dialing.

One of the features involved in attaining the indicated objects is the substitution of pushbuttons or keys for the finger wheel of the widely used dial telephone.

Another feature lies in mechanical means for coupling the pushbuttons to a transmitter suitable for signaling from a telephone substation-set to a central office.

Each of the transmitters herein described and claimed comprises a plurality of pushbuttons connectable selectively to a mechanism for sequentially storing coded information and sequentially releasing it in the order of storage to operate a code sender connected to a transmission line.

The mechanisms, hereinafter described as illustrative embodiments of the invention, are similar in general organization but differ in various features. Accordingly, one embodiment will be described initially and then the variations will be pointed out.

Other objects and features than those particularly enumerated will appear more fully and clearly in the ensuing descriptions of the illustrative embodiments of the invention considered in connection with the appended drawing in which.

Figure 1:
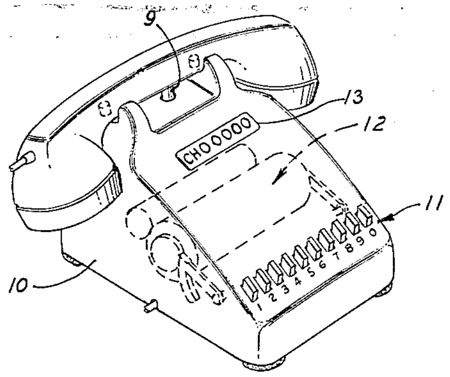
FIG. 1 shows a conventional telephone set equipped with the mechanism of this invention.

As illustrated in FIG. 1, the transmitter of this invention may be installed in a desk telephone set 10. The row of keys or pushbuttons 11 may have digit designations on the set housing as shown or on the tops of the buttons. That part of the operating mechanism enclosed in the housing and later more particularly described is designated as 12. A digit displaying window 13 may be used if desired, in accordance with details to be later described. The mechanism 12 may be secured to a base insertable into the telephone housing or may be secured to the base of the housing. In either case, the pushbuttons protrude through suitable openings in the housing.

Figure 2:
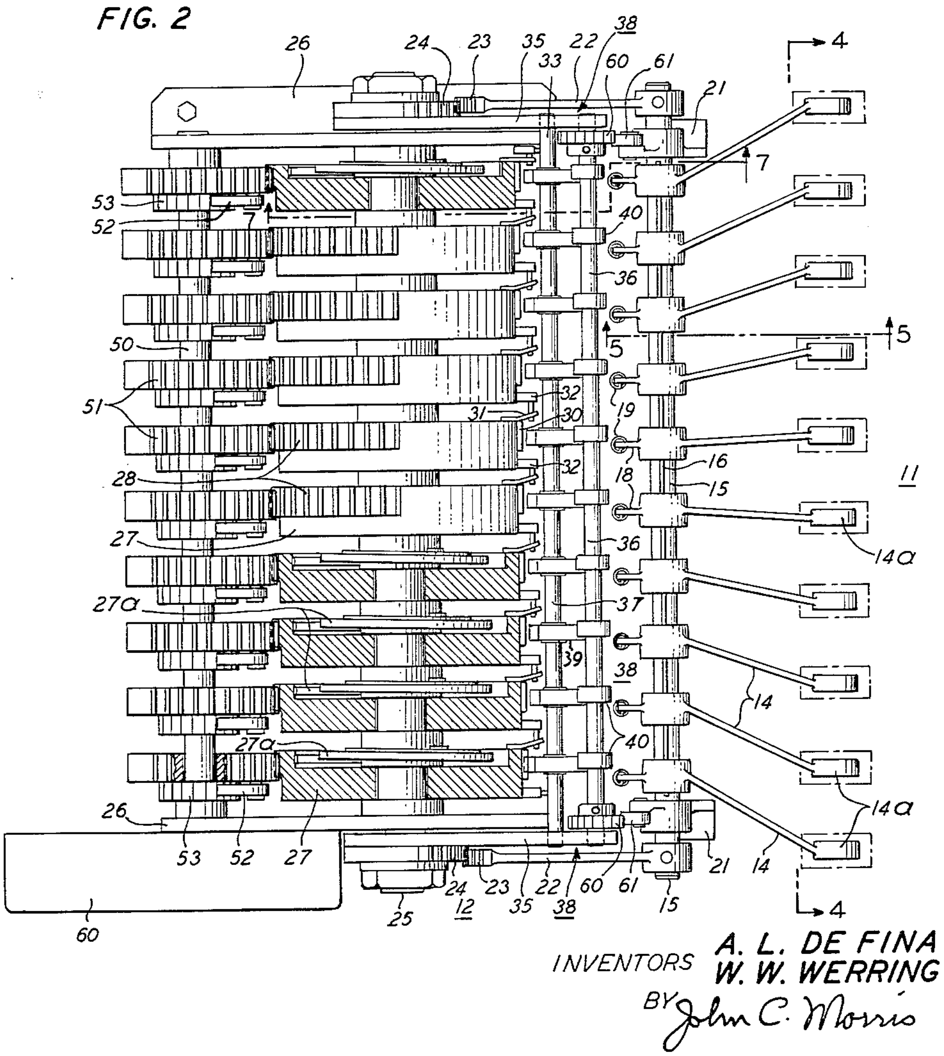
FIG. 2 is a plan view with parts in section of the mechanism without the telephone set housing.

The transmitter mechanism is shown generally in plan in FIG. 2. Each button 11 is shown in phantom in relation to the outer end 14*a* of its lever 14. The levers are essentially the same except for lateral offsets and are keyed to a shaft 15 by a spline 16 that operates within an arcuate slot 17 in each lever (see FIGS. 5 and 6). The spline and slot arrangement is to allow for lost motion between the lever and shaft, the reasons for which will become apparent. A projection or ear 18 on each lever serves to secure one end of a spring 19 (see FIG. 5), the other end of which is anchored to a suitable fixed member such as the base.

The shaft 15 is journaled in bearings 21, which may be fastened to the base in a suitable manner. Operating or sector arms 22 are fixed to opposite ends of the shaft and each has at its outboard end a sector gear 23 that meshes with a gear segment 24 on each end of a main shaft 25.

The shaft 25 is mounted in standards 26 secured to the base. A plurality of storage wheels 27 is mounted on the shaft 25 so as to be rotatable independently of this shaft. Each storage wheel may comprise a disc having a gear segment 28 on one portion of its periphery and a series of ratchet teeth 29 on a generally opposite portion of this periphery (see FIG. 3). Each wheel also has a projection or dog 30 (FIGS. 7 and 8) located on its rim between the gear section and the ratchet teeth. At the end of the ratchet tooth section adjacent the dog 30 is a tripper 31 for cooperation with the ratchet holding member or pawl 32 of the next adjacent storage wheel.

Each wheel 27 has a return spring 27*a*, which may, as a space conservation measure, be located in a depression on one side of the wheel. This spring is arranged to be wound when a wheel is set and to drive the wheel back to its unoperated position when the wheel is released.

A shaft 33 mounted to the base by suitable means carries a plurality of ratchet holding members or pawls 32, one for each storage wheel and one more. The additional dummy pawl 32*a* is located in a position to be tripped by the last storage wheel tripper. This pawl is connected by a bar 33*a* to the holding member or pawl 32 at the other end of the shaft so that when 32*a* is tripped, this first member 32 moves with it to release the first storage wheel. The pawls 32 are urged toward the ratchets 29 by the springs 32*b*. These pawls are secured to the shaft 33 by a spline and arcuate slot arrangement like the spline 16 and slot 17 that interconnect the lever 14 and the shaft 15 with lost motion.

Mounted for rotation around the shaft 25 by the gear segments 24 are arms 35 which with shafts 36 and 37 comprise a yoke 38. This yoke is rotatable to various positions by selective operation of the buttons 11.

Figure 7:
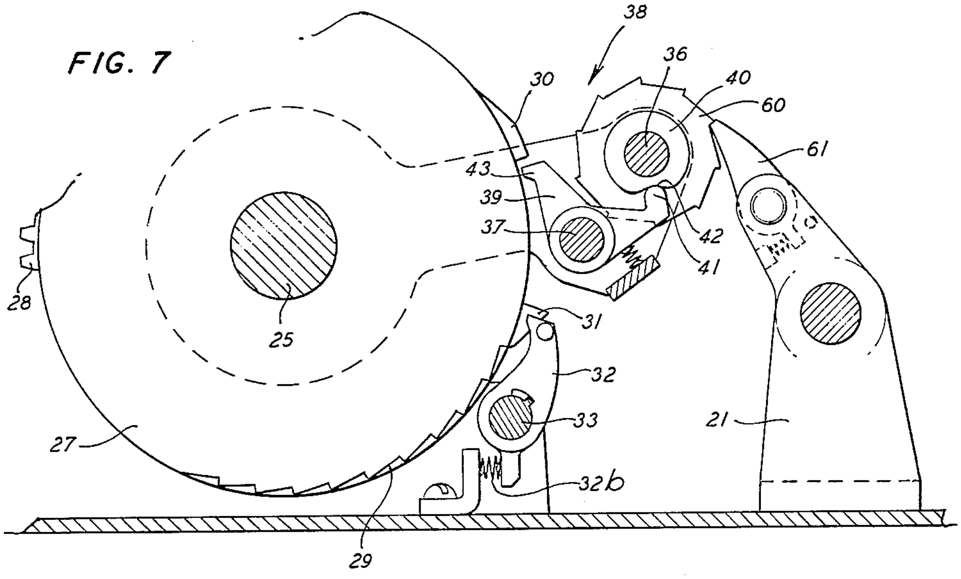
FIG. 7 is a view from line 7—7 of FIG. 2, showing a portion of the operating linkage.
Figure 8:
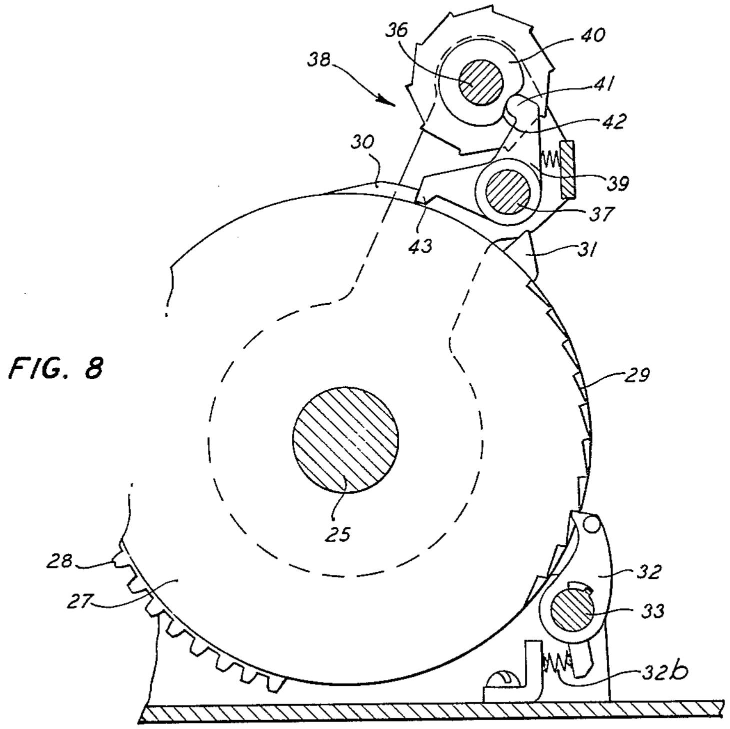
FIG. 8 is a similar view to that of FIG. 7, showing the same portion of the operating linkage in another position.

A plurality of cams 40 is spaced along the shaft 36 and a corresponding plurality of bell cranks 39 along the shaft 37. As shown in FIGS. 7 and 8, each bell crank has on one arm a projection 41 for cooperation with a low portion or notch 42 of each of the cams 40. These bell cranks also each have on their other arms a projection 43 which cooperates with the dog 30 on the corresponding storage wheel to set this wheel.

The cams 40 are fixedly mounted on the shaft 36 with their low portions or notches 42 in a spiral arrangement. In an assembly with ten storage wheels, each portions 42 of the cams will be spaced 36 degrees from its neighbors. Thus, all of the bell cranks but one will be held in an inoperative position by its cam 40. The operative bell crank will have its projection 41 in the notch 42 of its cam and be in a position such that the projection 43 bears against the dog 30 to drive its wheel 27 to set position when the yoke 38 is rotated counterclockwise, as seen in FIGS. 3, 7, and 8.

Parallel to the shaft 25 is a shaft 50 on which is mounted a plurality of pinions 51, each meshing with the gear sector 28 of a corresponding storage wheel 27. Secured to each pinion 21 is a pawl 52. The pinions are mounted for rotation with respect to the shaft 50. For each pinion, there is an adjacent ratchet wheel 53 secured to the shaft 50. A pinion, pawl, and ratchet thus comprise a one-way drive. Shaft 50 may be connected to a conventional pulsing contact arrangement 60, such as is used in present day telephones.

Figures 3, 4:
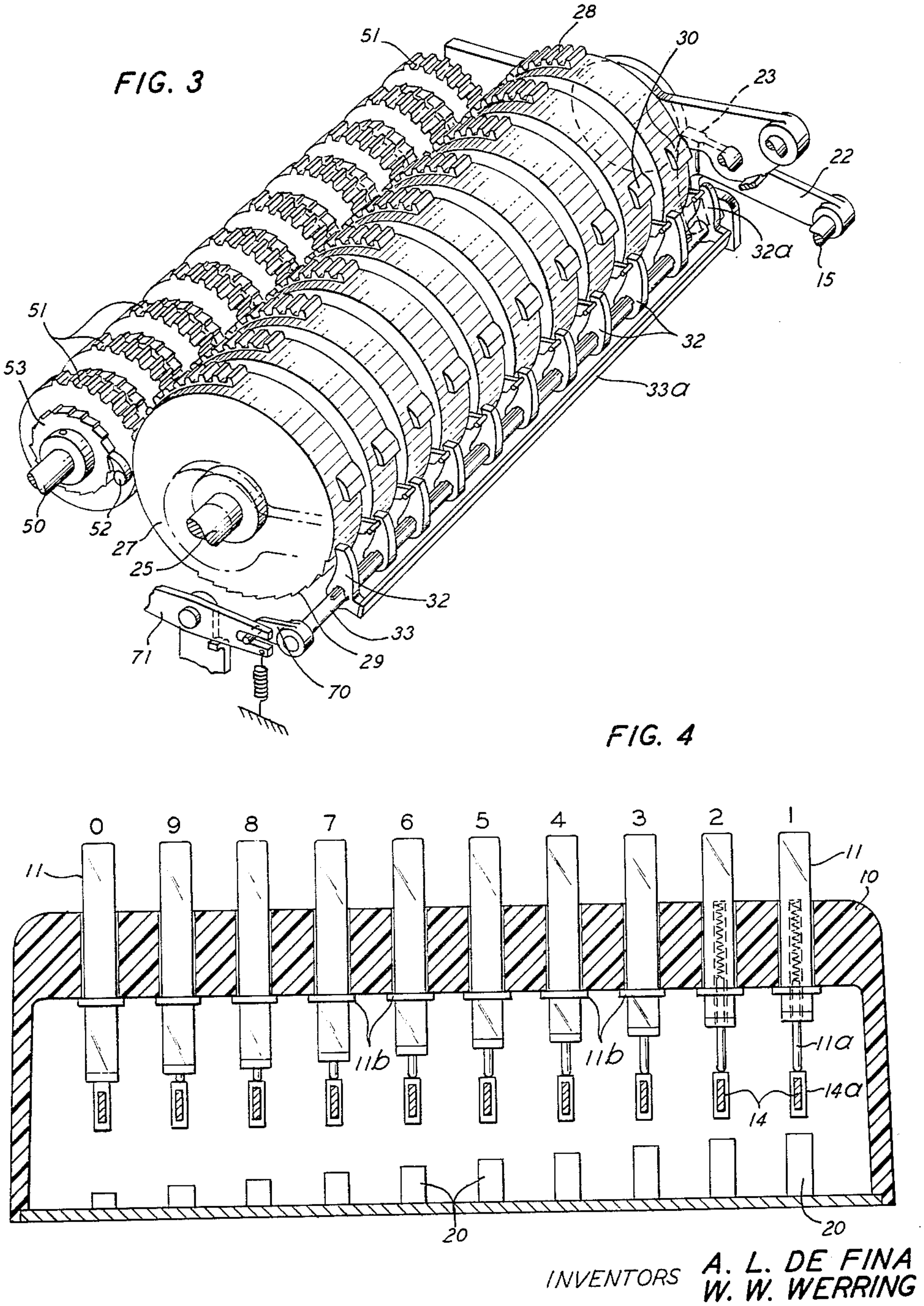
FIG. 3 is a perspective view of a portion of the mechanism.
FIG. 4 is a sectional view on the line 4—4 of FIG. 2 of the pushbuttons or keys with attendant appurtenances.
Figure 5:
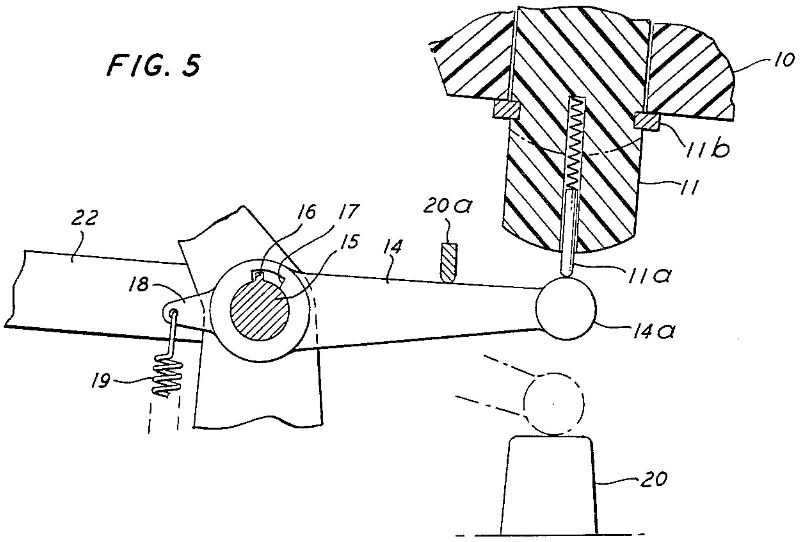
FIG. 5 is a fractional view as seen from the line 5—5 of FIG. 2.
Figure 6:
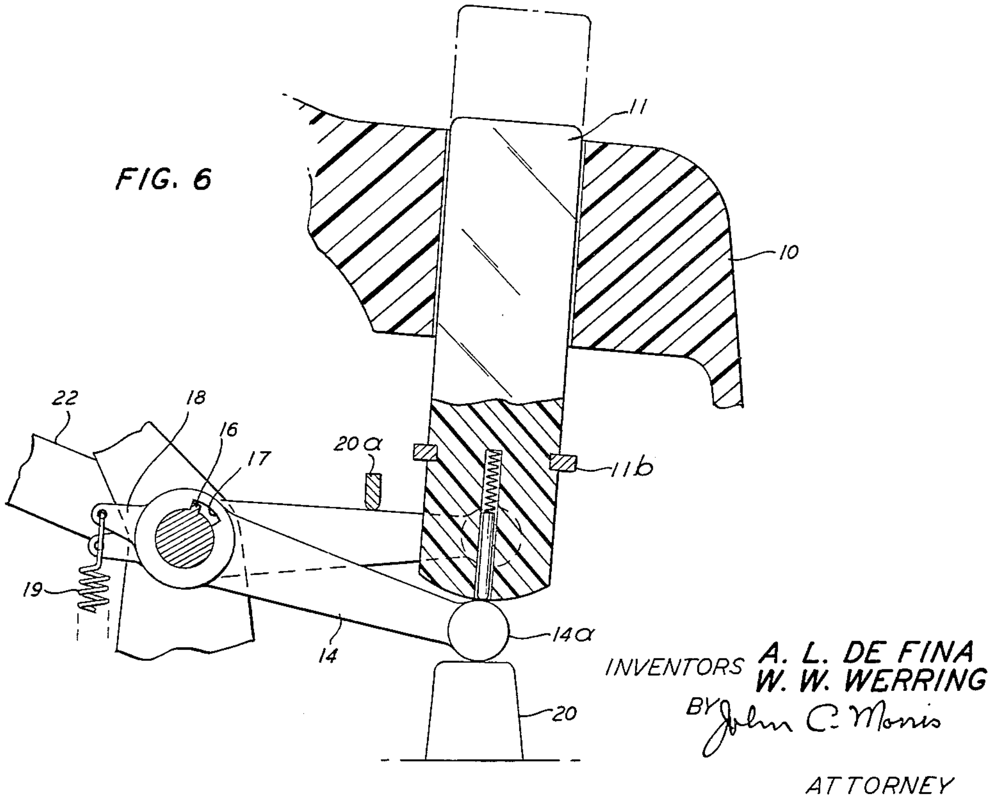
FIG. 6 is another view similar to that of FIG. 5 with some parts differently positioned.

As illustrated in FIGS. 4, 5, and 6, each button 11 includes in its lower end a spring pressed plunger or pin 11*a* resting on the cylindrical knob 14*a* of each lever 14.

Under each knob 14*a* is a stop 20 for limiting the downward travel of the lever 14. As shown in FIG. 4, these stops are of progressively greater height from left to right. The travel of the left-most lever, which is operated by the zero digit button, must be far enough to send out ten impulses on the pulsing device, while the travel of the right-most lever is only far enough to provide for sending a single pulse. The main bodies of the buttons are of different lengths but their shoulders 11*b* are all at the same distance from their tops. In the unoperated condition, the knobs 14*a* are at the same level, their levers 14 being against the stop bar 20*a* (FIGS. 5 and 6) which may extend across all of the levers.

On the ends of the cam shaft 36 are ten-tooth ratchet wheels 60. Pawls 61 pivoted to the brackets 21 cooperate with these ratchet wheels to rotate the shaft 36 one-tenth of a revolution each time the yoke returns from a storage wheel positioning movement. By this expedient, the spirally arranged cams 40 successively position each bell crank 39 to drive its particular storage wheel.

A description of the operation of the previously described mechanism is given with respect to making a particular call. Say the number to be called is 201-582-3329, that is, station 3329 on exchange 582 in area 201.

The depression of button 11 for the digit 2 will move the corresponding lever 14, its shaft 15, the operating arms 22, and the sector gears 23 clockwise as the device is depicted. The gear segment 24 is thus rotated counterclockwise and with it the arms 35 and the yoke 38. Assuming that the projection 41 on the bell crank 39 is in the notch 42 of the first cam 40, that is, the one nearest to the viewer, the projection 43 of the bell crank will abut against the dog 30 on the first signal storage wheel 27 and drive it counterclockwise winding the spring 27*a*.

The pawl 32 of this first wheel will be held out of engagement with the ratchet teeth 29 by virtue of the action of the tripper 31 of the last storage wheel by way of the dummy pawl 32*a* and the connecting bar 33*a*. Thus, as soon as the button is released, the storage wheel returns in a clockwise direction. This drives the pinion 51 and with it the shaft 50 by way of the pawl and ratchet 52, 53. The gear ratio is such that the shaft 50 rotates sufficiently to transmit the two impulses representative of the digit 2.

Meanwhile, the operator has successively pressed the buttons for the remaining digits 0, 1, etc. of the telephone number and since it is a ten-digit telephone number, has set all of the storage wheels.

As soon as the first wheel returns to the unoperated position, it operates with its tripper 31 to remove the pawl 32 of the next adjacent storage wheel from its holding position to transmit the digit zero. Thus, it goes down the line until all ten digits are retrieved from storage and transmitted. Because this is a ten-digit number, the first storage wheel is by now prepared to again transmit immediately upon being positioned. It will be remembered that this successive operation is because of the incremental rotation of the cam shaft 36 and its cams 40 by the ratchet and pawl 60, 61 at the end of each return stroke of the yoke 38.

With this arrangement, the code may be stored as fast as the operator can press buttons. If the telephone number transmitted is shorter than that noted, say four digits only, four storage wheels will be used and the first digit of the next telephone number to be transmitted will be stored on the fifth wheel, and so on.

It is apparent then that with this around-the-circuit operation, one could send a number of more than ten digits with a ten-wheel assembly, since the first storage wheel would be ready for the eleventh digit, and so on. It is also possible to have less than ten storage wheels, say five, because the No. 1 wheel would be ready to store when the No. 5 has released, and so on. A limitation here is that there be enough storage wheels to keep ahead of the fastest possible operation of the pushbuttons. In other words, at least one wheel must be always ready to store a digit.

If less than ten storage wheels are used in the device, there will be a corresponding reduction in cams, bell cranks, holding pawls, etc. The reduction in the number of cams will require a reorientation of the low points or notches of the cams so that they will be equally spaced circumferentially around their shaft.

If a wrong key is pressed with this transmitter, one can hang up and start over again, as with present transmitters, but because of storage of signals, a sufficient time will be required to allow all of the wheels to release. In order to avoid this, a crank 70 operated by a lever 71 may be attached to the pawl shaft 33 so that all of the active pawls may be removed from their ratchets at once. Any well-known linkage may be used to connect the lever 71 to a button 9 or the like on the subset 10. This button could be operated in various ways to accomplish the indicated result. One way would be to place it on the subset, as shown in FIG. 1, and another to make it part of the switch-hook operating mechanism so that hanging up of the handset would in either case automatically operate the reset means.

Other embodiments of the invention may be made from the basic structure so far described by the introduction of suitable variations. For example, the pawl 32 of the first storage wheel, the pawl 32*a* at the other end, and the connecting bar 33*a* may be omitted. For such a transmitter, immediate retrieval of the information stored in the first wheel occurs because of the absence of a pawl or holding member 32. From there on the operation continues down the line as previously described.

A transmitter of the type just noted must have as many storage wheels and their appurtenances as there are digits in the maximum length telephone number to be transmitted. Of course, a number with less digits could be transmitted but this requires resetting so that the first wheel will be available for starting the next number. A resetting mechanism may be provided by means of a suitable linkage between the reset lever 71 and the pawls 61 of the cam advancing means, plus a biasing spring on the cam shaft 36. The cam shaft may be biased to a home or initial position and advanced incrementally against this bias by the ratchets and pawls 60, 61. At the termination of a call, operation of the reset means by way of its lever 71 would also retract the pawls 61 allowing the cams to return to the home position.

Another embodiment of the invention involves number wheels connected to each storage wheel so that the called number may appear in a window 13, as shown in FIG. 1. In order to obtain the benefit of such means for checking the number before transmission, the mechanism should be designed to store all of the digits and then to be released to transmit them serially.

What is claimed is:

1. A signaling device comprising a signal transmitting means, a plurality of pushbuttons, a plurality of storage wheels, setting means for positioning said wheels to store a signal, said pushbuttons each corresponding to a different signal code element, means for connecting any button to any storage wheel by way of the setting means, means for enabling the setting means to sequentially position one storage wheel at a time, means for sequentially releasing the storage wheels, and connecting means for transferring the released motion of each storage wheel to the signal transmitting means.

2. A signaling device comprising a signal transmitting means, a plurality of pushbuttons, a plurality of storage wheels, setting means, including a rotatable yoke, for positioning said wheels to store a signal, said pushbuttons each corresponding to a different signal code element, means for connecting any button to any storage wheel by way of the setting means, means in the yoke for enabling the setting means to sequentially position one storage wheel at a time, means for sequentially releasing the storage wheels, and connecting means for transferring the released motion of each storage wheel to the signal transmitting means.

3. A signaling device comprising a code transmitter, a plurality of deflectable keys, and mechanism interconnecting the transmitter and the keys; said mechanism comprising a plurality of settable storage members, a corresponding plurality of transmitting members individually connectable to operate the code transmitter, means connecting each transmitter member to a storage member for receiving a stored signal therefrom upon its release, common operating means to connect any key to set any storage member, these operating means including a serially operable control mechanism settable by successive operations of the operating means to condition said operating means to set the storage members successively, means on each storage member for activating the next storage member to release its signal, and means limiting each key to a deflection corresponding to a particular signal element of a code.

4. A signaling device as in claim 3 and having means for resetting the storage members simultaneously.

5. A signaling device as in claim 4 and having additional means for resetting the serially operable control mechanism.

6. A signaling device as in claim 3 in which the code transmitter is a conventional telephone dialing pulse transmitter.

7. A signaling device as in claim 3 in which the serially operable mechanism is a series of helically arranged cams and a ratchet and pawl means for successively operating each cam to operative position.

8. A signaling device comprising a transmitter, a plurality of pushbuttons, and mechanism interconnecting the transmitter and the pushbuttons; said mechanism comprising a plurality of storage wheels, a corresponding plurality of transmitting members individually connectable via a one-way drive to operate the code transmitter, means including intermeshing gear teeth connecting each transmitter member to a storage wheel for receiving a stored signal therefrom, common operating means to connect any key to any storage member, these operating means including a serially operable control mechanism settable by successive operations of the operating means to condition said operating means to set the storage wheels successively, means on each storage wheel for activating the next storage wheel, and means limiting each pushbutton to a deflection corresponding to a particular signal.

9. A telephone signal transmitter comprising ten pushbuttons, a plurality of signal storage wheels, a lever for each pushbutton and deflectable thereby, a yoke operable by any lever, stop means for limiting the extent of deflection of each lever, means on said yoke for individual cooperation with each storage wheel and other means thereon to limit the cooperation to one wheel at a time serially, tripping means on each storage wheel to release the next adjacent wheel, and means operated by each storage wheel as released to transmit a code corresponding to operated buttons in the order that they were operated.

References Cited by the Examiner

UNITED STATES PATENTS

| | | | |
|---|---|---|---|
| 2,389,247 | 11/45 | Dowe | 179—90 |
| 2,558,187 | 6/51 | Marrison | 179—90 |

ROBERT H. ROSE, *Primary Examiner.*